(12) United States Patent
Höller

(10) Patent No.: US 6,717,955 B1
(45) Date of Patent: Apr. 6, 2004

(54) DATA COMMUNICATIONS METHOD AND APPARATUS

(75) Inventor: Jan Höller, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/307,583

(22) Filed: May 7, 1999

Related U.S. Application Data

(63) Continuation of application No. PCT/SE98/01591, filed on Sep. 8, 1998.

(30) Foreign Application Priority Data

Aug. 9, 1997 (SE) ................................................ 9703223

(51) Int. Cl.⁷ ................................................ H04J 3/24
(52) U.S. Cl. ...................................... 370/474; 370/476
(58) Field of Search ................................. 370/386, 389, 370/395.1, 396, 395.6, 395.62, 435, 436, 474, 476; 375/389

(56) References Cited

U.S. PATENT DOCUMENTS

| | | | |
|---|---|---|---|
| 5,327,421 A | * 7/1994 | Hiller et al. | 370/60.1 |
| 5,422,882 A | * 6/1995 | Hiller et al. | 370/60.1 |
| 5,623,491 A | 4/1997 | Skoog | |
| 5,838,718 A | * 11/1998 | Ichihashi | 375/202 |
| 5,870,397 A | * 2/1999 | Chauffour et al. | 370/435 |

FOREIGN PATENT DOCUMENTS

GB  2 291 561  1/1996

* cited by examiner

*Primary Examiner*—Wellington Chin
*Assistant Examiner*—Raj Jain

(57) ABSTRACT

There are voice signals from at least two voice sources which are multiplexed by an ATM Adaptation Layer 2 multiplexer (AAL2 MUX) into the same ATM connection after having been processed by a packetizing device, such that the AAL2 WX is presented with assembled AAL2 packets of a suitable periodicity. If the voice data signals are to be compressed, the packetizing device includes an encoder of a suitable voice codec, e.g. ADPCM, GSM, LD-CELP or CS-ACELP. The voice encoders may also include devices for silence removal. The packetizing device further includes a packetizer, either separated from the voice encoder, or as a part thereof. The packet releases from the packetizing device are synchronized to occur virtually simultaneously. In this way, the released packets from the packetizing device arrive almost simultaneously at the AAL2 MUX, with the result that an ATM cell may be filled with AAL2 packets well before the expiration of the timer of the AAL2 MUX.

24 Claims, 4 Drawing Sheets

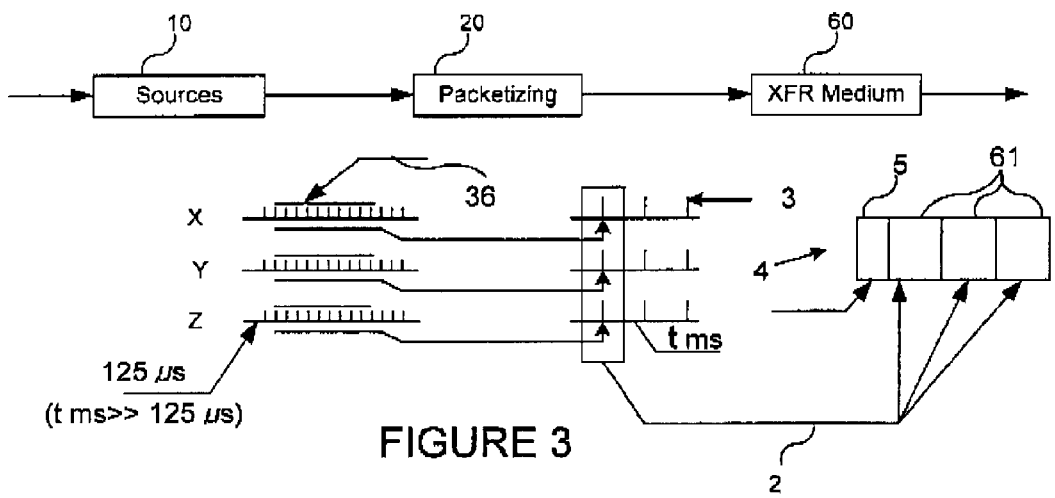
FIGURE 3
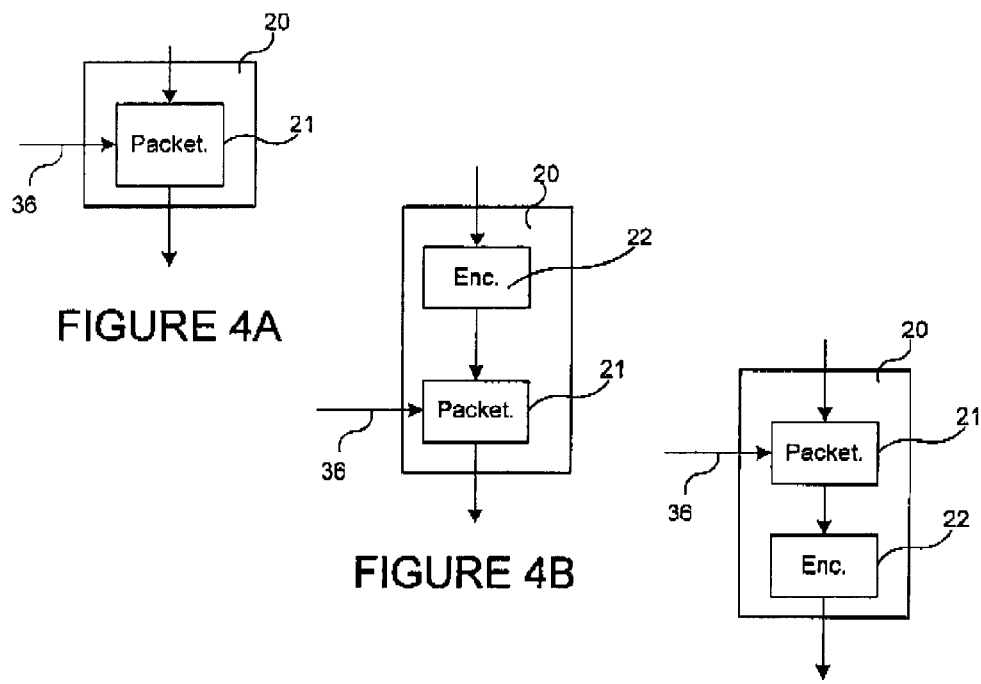
FIGURE 4A
FIGURE 4B
FIGURE 4C

DATA COMMUNICATIONS METHOD AND APPARATUS

This application is a continuation of International Application No. PCT/SE98/01591 filed on Sep. 8. 1998, which designates the United States.

BACKGROUND

This invention relates generally to the packetization of data streams. More particularly, this invention relates to packetizing voice signals and transporting the packetized voice signals using Asynchronous Transfer Mode (ATM) after having multiplexed the packetized voice signals from several sources into the same ATM cell.

Voice or speech information in existing telecommunication networks, as e.g. Public Switched Telephone Network (PSTN) and Integrated Services Digital Network (ISDN), is normally transported as PCM coded samples. According to ITU-T G.711, PCM stands for Pulse Code Modulation of voice frequencies and means that the basic time slot is 8 bits every 125 $\mu$s, giving rise to channels of 64 kbit's. Consequently, PSTN and ISDN are 64 kbit/s circuit-switched networks. Circuit stands for a set of physical transmission resources, e.g. lines and exchanges, that provide for a two-way transfer of message signals from source to destination in a telecommunication system. Several circuits are time multiplexed over one link by joining together several time slots in a frame which is again repeated with a certain frequency. A circuit will always use the same time slot in the frame during the complete duration of the session. When transporting the PCM coded samples over an ATM network, i.e. a packet switching network instead of a circuit-switched data network, one way for the ATM network to achieve this is to emulate a virtual circuit. The emulation is carried out by a Circuit Emulation Service (CES) as specified by the ATM Forum Circuit Emulation Service Interoperability Specification Version 2.0, which comprises an ATM Adaptation Layer 1 (AAL1) adapting circuits of constant bit rate to an ATM cell transport.

Transporting a 64 kbit/s circuit using AAL1 can be done in basically two ways. One is to entirely fill the ATM cell payload, i.e. the information field, generally of 47 octets (48 octets for the information field-1 octet for the AAL1 header) with PCM samples, resulting in an ATM packetization delay of 47*125 $\mu$s, i.e. 5875 ms. The extra overhead added by the 5 octets ATM cell header and 1 octet AAL1 packet header amounts to roughly 13 percent of the nominal bit rate of 64 kbit/s. The other way is to only partially fill the ATM cell payload with PCM samples before sending it, and thus reduce the ATM cell packetization delay, but paying penalty by increased overhead. For instance, by only filling the cell by a sixth, i.e. by around 8 PCM samples, the delay can be reduced to around 1 ms. It is important to keep delay at a low level for all parts of the network, since delay in combination with echo may severely degrade the perceived voice quality.

Voice signals may also be carried in other encoding formats than the above mentioned PCM format. These encoding formats being a part of a voice codec may be according to e.g. the Global System for Mobile Telecommunication (GSM) standards, Adaptive Differential PCM (ADPCM) standards, Low Delay Code Excited Linear Prediction (LD-CELP) standards or Conjugate Structure Algebraic Code Excited Linear Prediction (CS-ACELP) standards. A common property for all these voice codes is that they compress the voice signals according to a compression algorithm such that they produce coded voice information, i.e. packets or frames, with a resulting bit rate which is lower than the common 64 kbit/s PCM based coding scheme. The result is therefore, that when using AAL1, the ATM packetization delay and/or overhead (if partially filled cells are used) increases roughly by a factor equal to the degree of compression. For instance, an 8 kbit/s CS-ACELP coded voice signal would result in an ATM packetization delay as long as 47 ms. This could as before be traded by partially filling the cell, bit with the same scaling factor of 8 for the resulting bandwidth overhead. In addition, some voice codes based on GSM and CS-ACELP already have an inherent algorithm delay which is fairly large which also has to be added in a total network perspective.

The different voice codes produce packets at varying rates and sizes which are not commensurable with the ATM payload length, resulting in padding or segmentation problems. With these voice encoders it is also possible to filter out silent periods of speech and to reduce or stop the emission of voice data during those silent periods (hereinafter referred to as silence removal). Silence removal results in a variable bit rate, which is not suitable for a constant bit rate transport service such as the CES based on AAL1.

A new ATM Adaptation Layer (AAL) for the purpose of transporting packetized low bit rate data, such as packetized voice, and which data is real-time critical and of variable rate and length, is in the process of being standardized. This new AAL is denoted AAL type 2 (AAL2), which is specified in the ITU-T Draft 1.363.2, B-ISDN ATM Adaptation Layer Type 2 Specification. Seoul, February 1997. AAL2 is designed to provide support for applications requiring low delay with reasonable bandwidth efficiency and variable packet sizes. AAL2 is also asynchronous.

In AAL2, voice signals from several sources are multiplexed into the same ATM connection. This is done by encapsulating user data into AAL2 packets, which are multiplexed using the AAL2 multiplexer function (AAL2 MUX) inherent in the AAL2 Common Part Sublayer, into an ATM connection. Reduced delay is provided through inclusion of a Combined Use-timer (Timer_CU) in the AAL2 which guarantees a maximum holding time of user data, or AAL2 packets, before transmission of the carrying ATM cell. The maximum packetization delay introduced by the AAL2 ATM is then basically equal to the value of the Timer_CU. The penalty to be paid is overhead in bandwidth if an ATM cell is not completely filled upon transmission.

In a typical scenario using AAL2, there are n voice sources which ire multiplexed by an AAL2 MUX into the same ATM connection after having been processed by an encoder with a suitable voice coding algorithm. Each voice encoder may be combined with a packetizer such that the AAL2 MUX is presented with packets of a suitable periodicity. The voice encoders may also include means for silence removal. Hence, after processing, the AAL2 MUX is presented with packets having a variable length p and/or packet rate f. A typical appropriate value for $T_{Timer\_CU}$ is 1 ms, which is based on calculations and simulations. Generally, $T_{Timer\_CU}$ is much less than the packet periodicity t (=1/f) for most encoders, also when they are combined with packetization procedures similar to those proposed by ITU-TG.764, Voice Packetization-Packetized Voice Protocols, or FRF.11, Voice over Frame Relay Implementation Agreement, FR Forum. The result is that there is a low probability of including several packets from different voice sources in the same ATM cell when the number of sources are few, e.g. less than 20. The remaining part of the ATM cell, which is not filled with packets at the expiration of the Timer_CU, is then padded. However, at few sources, the resulting padding overhead very much destroys the advantage of having employed encoders, with or without silence removal. A situation where this could be a problem is when doing PBX trunking. PBX stands for Private Branch Exchange and is essentially an on-premise telephone exchange system that services a number of telephones within a building.

It should therefore be appreciated that there is a need for a device and related system and method for more efficiently transporting packetized data from several sources on a packet oriented transport medium and in particular when there arc only a few sources.

SUMMARY

This invention is embodied in a method according to claims 1 to 6, a related apparatus according to claims 7 to 17 and a related system according to claims 18 to According to the invention there is an apparatus and a corresponding method for packetizing at least two data streams, comprising at least two packetizing means, each packetizing means producing first packets from said respective data stream, and a synchronizing unit for coordinating the packetizing means to substantially synchronously produce said first packets.

Preferably, the synchronizing unit comprises means for receiving permission requests for packetizing from the respective packetizing means, means for transmitting permission to packetize to the respective packetizing means, and a synchronizing unit for transmitting said permission to packetize to the respective packetizing means to coordinate said respective packetizing means to release substantially synchronously said first packets with other packetizing means already releasing first packets.

The packetizing means which virtually simulataneously produce first packets may form a synchronization group. The synchronizing unit may comprise means for forming synchronization groups, each synchronization group comprising between one and a predetermined number of packetizing means. The number of packetizing means belonging to a synchronizing group depends on the chosen encoding format and on how efficient the designer of the system wishes the system to be.

The packetizing means may either comprise: solely a packetizer for packetizing the respective data stream into first packets; encoding means for encoding the respective data stream into data blocks according to a predetermined encoding format, e.g. ADPCM or LD-CELP, and a packetizer for producing first packets from the data blocks; or a packetizer for producing data blocks from the respective data stream and encoding means for encoding the data blocks into first packets according to a predetermined encoding format, e.g. GSM or CS-ACELP. The packetizer may thus be an integral part of a specified voice encoding scheme.

The packetizing means may furthermore comprise means for silence removal. Providing the silence removal is well known in the art.

According to the invention there is furthermore a system for packetizing at least two data streams, comprising at least two sources producing the respective data streams, an apparatus for packetizing said at least two data streams, comprising at least two packetizing means, each packetizing means producing first packets from said respective data stream, and a synchronizing unit for coordinating the packetizing means to substantially synchronously produce said first packets, said system further comprising a packet oriented transport medium and multiplexing means for multiplexing the resulting first packets into respective second packets onto the packet oriented transport medium.

The data streams preferably comprises digitized audio and/or video information.

The packet oriented transport medium may be a transport medium according to the ATM, the second packets are then ATM-cells, and the multiplexing means is an AAL2 MUX for producing AAL2-packets from respective first packets and multiplexing the AAL2-packets into the second packets. Preferably, the predetermined number of packetizing means that belong to a synchronization group is determined by the number of AAL2-packets that fit into the respective ATM-cells. As the ATM cell payload size is framed, there is a possibility that the number of AAL2 packets that fit into the ATM cell payload is not an integer number. In these cases, two possibilities exist for the remainder of the ATM cell payload. The first is to pad the cell with dummy information. The second is to use AAL2 segmentation. i.e. to segment the last AAL2 packet into two ATM cells. Both padding and segmentation are functions which are well known to the person skilled in the art. The predetermined number of packetizing means belonging to a synchronization group may thus stretch over more than one ATM cell. The number is mainly determined by the AAL2 packet size in comparison with the ATM cell payload and how efficient one wants to design the system.

Hence, according to a preferred embodiment of the invention, there are voice signals from at least two voice sources which are multiplexed by an ATM Adaptation Layer 2 multiplexer (AAL2 MUX) into the same ATM connection after having been processed by a packetizing means such that the AAL2 MUX is presented with assembled AAL2 packets of a suitable periodicity. If the voice data signals are to be compressed; the packetizing means comprises an encoder of a suitable voice codec, e.g. ADPCM, GSM, LD-CELP or CS-ACELP. The voice encoders may also include means for silence removal. The packetizing means further comprises a packetizer, either separated from the voice encoder, or as a part thereof. The packet releases from the packetizing means are synchronized to occur virtually simultaneously. In this way, the released packets from the packetizing means arrive almost simultaneously at the AAL2 MUX, with the result that an ATM cell may be filled with AAL2 packets well before the expiration of the timer Timer_CU of the AAL2 MUX.

According to another embodiment of the invention, the packet oriented transport medium may be Frame Relay or IP. The invention may thus be part of a system providing Voice over Frame Relay or Voice over IP.

An advantage of the invention is that it is possible to efficiently fill the second packets, e.g. ATM cells, with data from a few sources before the second packets are transported on the packet oriented transport medium. As a result it is possible to maintain the packetization delay at a low level, but still providing a high level of bandwidth utilization/efficiency.

The current use of AAL2 for packetized voice transport is optimized for mobile applications where the typical number of sources multiplexed on a single ATM connection is in the few hundreds. AAL2 has attracted a lot of attention to be used also for PBX trunking. However, the number of voice sources, e.g. 50 or less, for PBX trunking is significantly lower than for a mobile trunking application which makes the use of AAL2 less optimal. However, with the use of the proposed solution, the current problem of few sources can be overcome and AAL2 might prove to be as useful for PBX trunking as for mobile trunking. Note that PBX trunking is just one example of where few sources might be present. Another example could be an ATM based residential access network used to carry telephony traffic.

BRIEF DESCRIPTION OF THE DRAWINGS

FIG. 3 is a diagram depicting the timing of the outputting of packets in accordance with the preferred embodiment of the invention;

FIGS. 4a, 4b and 4c show block diagrams depicting where the packet synch signal is received by the different types of packetizing means.

DETAILED DESCRIPTION

Figure 1:
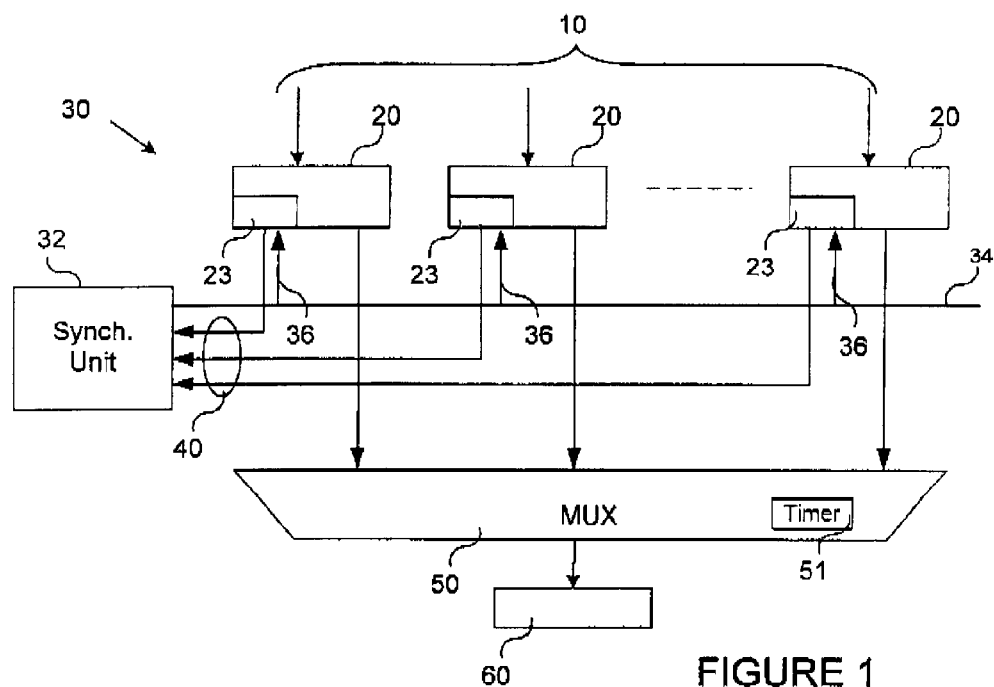
FIG. 1 is a block diagram depicting a system comprising synchronizing means that is suitable for practicing the preferred embodiment of the invention.

FIG. 1 is a block diagram depicting synchronizing means 30 that is suitable for practicing the preferred embodiment of the invention. The synchronizing means 30 comprises a synchronizing unit 32 for synchronizing the activity of a plurality of packetizing means 20 for generating packets having a length p at a rate f. The synchronization is achieved by using a synchronization bus 34 for transmitting packet synch signals 36 between the synchronizing unit 32 and the packetizing means 20. Each packetizing means 20 is connected to a respective source 10 and receives data input therefrom.

The data input may e.g. be voice signals or video signals. The voice signals are preferably a stream of 8 bit PCM coded samples. The video signals may be low bit rate video according to the ITU-T specification H.261 or H.263. Each packetizing means 20 is connected to a multiplexer 50 for multiplexing packets outputted from the packetizing means 20 onto a packet oriented transfer medium 60. Before outputting packets, the packetizing means 20 transmits an activation request 40 to the synchronizing unit 32. The synchronizing unit 32 will then transmit a packet synch signal 36 via the synchronization bus 34 to the packetizing means 20 for activating the same in synchrony with other already activated packetizing means 90 or as a first member of a new synchronization group 2. The term will synchronization group 2 will be described below.

According to a preferred embodiment the packet oriented transfer medium is an ATM switch network and the multiplexer is an AAL2 multiplexer 50 comprising a Timer_CU 51 for guaranteeing a maximum holding time of AAL2 packets, before transmission of the carrying ATM cell.

Figure 2:
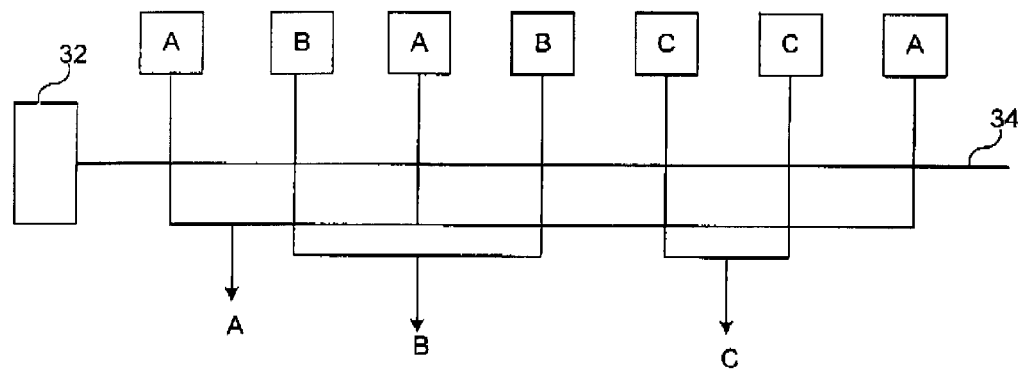
FIG. 2 is a block diagram depicting packetizing means formed into synchronization groups.

FIG. 2 is a block diagram depicting seven packetizing means 20 formed into synchronization groups A,B,C by the synchronizing unit 32. Supposing that there should be three packetizing means 20 per synchronization group, group A is full and group B and C each have room for one more packetizing means 20. The synchronization groups are distributed in time to avoid ATM cell bursts.

FIG. 3 is a diagram depicting the timing of the synchronous release of packets 3 in accordance with the preferred embodiment of the invention. Sources 10 outputs independently of each other a stream x,y,z of PCM samples at a rate 64 kbit/s, i.e. 8 bits every 125 μs. When the stream x,y,z of PCM samples are inputted to the packetizing means 20, the packetizing means 20 requests an activation signal 36 from the synchronizing unit 32 that it may begin to generate packets 3. The synchronizing unit 32 checks if there are other packetizing means 20 which are already generating packets 3. A predetermined number of packetizing means 20 which generates packets 3 in synchrony is called a synchronization group 2. Either the packetizing means 20 is allocated to an already existing synchronization group 2 or it is allocated to a, by the synchronizing unit 32, newly formed synchronization group 2. Until the packetizing means 20 has received a packet synch signal 36, it is not allowed to generate packets 3. Consequently, until activation, there will be some PCM samples which may be lost. The packetizing means 20 will output packets 3 every t ms, where t ms is much larger than 125 μs. The packets 3 are thereafter processed by an AAL2 MUX 50 which adapts the packets 3 such that they fit into an ATM cell 4. The ATM cell 4 comprises a header 5 and a predetermined of number of AAL2 packets 61. The predetermined number of AAL2 packets (61 which fit into an ATM cell 4 depends on the size of the packets 3 generated by the packetizing means 20. Since the number of AAL2 packets 3 which fit into an ATM cell 4 depends on the size of the packets 3 generated by the packetizing means 20, consequently the size of the synchronization groups 2 also depends on the size of the packets 3.

That the packetizing means 20 are substantially synchronized means that they are coordinated to release packets such that ATM cells are filled in the most optimal way before the expiration of the Timer_CU of the AAL2 MUX. For example, as the sample rate is 8 kHz for ordinary PCM coded voice, the AAL2 packet release cannot be made exactly simultaneously, but rather separated by a multiple of approximately 4 μs, which is the octet arrival time for the PCM samples on a 2 Mbit/s link for samples belonging to different speech channels. This works, since the sample interval of 125 μs is much less than the resulting voice packet periodicity t, which is in milliseconds, and that the voice packet periodicity is significantly larger than the value of Timer_CU 51.

FIGS. 4a, 4b and 4c show block diagrams depicting where the packet synch signal 36 is received by the different types of packetizing means 20.The key lies in timing when to create the blocks used as input to e.g. CS-ACELP encoders, or when to create the blocks from e.g. an ADPCM encoder, i.e. synchronizing the PCM samples/ bit blocks. Basically two different types of encoders exist: one which inherently produces packets, e.g. CS-ACELP and GSM encoders; and the other which produces bit blocks with 8 kHz sample rate, e.g. ADPCM and obviously PCM encoders.

For uncompressed voice (FIG. 4a), the packetizing means 20 only comprises a packetizer 21, which then receives packet synch signals 36 from the synchronization means 32. The packetizer 21, e.g. according to ITU-T G.764, receives 8 bit PCM samples at a sample rate of 8 kHz and outputs packets of length p at a rate f. Consequently, packetized PCM coded voice is outputted from the packetizing means 20.

An alternative to ITU-T G.764 could be similar to the packetizing method described in FRF.11, which in substance is based on the same underlying principles as G.764. Yet another alternative could be according to the coming ITU-T recommendation I.TRUNK which is currently being prepared by the ITU-T, to, among other things, provide methods for packetizing voice data streams within the AAL2 Service Specific Convergence Sublayer (AAL2 SSCS).

For compressed voice according to the ADPCM standards (FIG. 4b), the packetizing means 20 comprises a packetizer 21, which receives packet synch signals 36 from the synchronization means 32, and an encoder 22. For an ADPCM encoder 22, a packetizer 21 has to be added after the encoder in order to produce voice packets having a suitable length p and rate f since the ADPCM encoder outputs bit blocks of 5, 4, 3 or 2 bits at a sample rate of 8 kHz. This can be done in accordance with ITU-T G.764, FRF.11 or I.TRUNK. Consequently, packetized ADPCM coded voice is outputted from the packetizing means 20.

An alternative could be an LD-CELP encoder which produces bit blocks of 10 bits, with a bit rate of 1.6 kHz. Since these bit blocks are too short to be packetized into an AAL2 packet, a packetizer 21 is added after the LD-CELP encoder.

The same packetizing means structure for obtaining ADPCM or LD-CELP packetized voice could be used for packetizing PCM coded voice. This is achieved in that the encoder 22 is a null encoder, well known in the art, or comprises means for silence removal, which is well known in the art.

For compressed voice according to e.g. the CS-ACELP standards (FIG. 4c), the packetizing means 20 comprises a CS-ACELP encoder according to ITU-T G.729. A CS-ACELP encoder comprises a packetizer 21, which then receives the packet synch signals 36 from the synchronization means 32, and an encoder 22. The packetizer 21 of the CS-ACELP encoder 20 receives 8 bit PCM samples at the sample rate of 8 kHz and outputs 80 octet blocks at the block rate of 100 Hz which are inputted to the encoder 22. The encoder 22 then outputs packets of length 10 octets and packet rate of 100 Hz.

As explained it is crucial to synchronize the packet release from the packetizing means belonging to the same synchronization group to occur virtually simultaneously. In this way, the few AAL2 packets needed to fill the ATM cell arrive at the same time at the AAL2 multiplexer. As seen above, an AAL2 packet payload size may be 10 octets when using CS-ACELP. With an AAL2 overhead of 3 octets, the overhead being the common part sublayer protocol control information (CPS PCI), an ATM cell can contain 47/13≈3–4 AAL2 packets. It is, hence, enough to synchronize the release of packets from the 3–4 voice encoders in order to fill the ATM cell and achieve virtually the maximum efficiency. If e.g. three AAL2 packets are used to fill an ATM cell, the remaining unfilled part of the ATM cell is padded. If, on the hand, four AAL2 packets are used to fill an ATM cell, one AAL2 packet is segmented and put into a subsequent ATM cell. Consequently, it is the role of the synchronizing unit 32 to achieve the most optimal filling of the ATM cells by combining synchronization of the packetizing means 20 according to the invention, with segmentation and padding, which are both well known in the art. What is to be considered as the most optimal filling of the ATM cells is decided by the designer of the system, and may depend on available bandwidth, the exact packet length, typical number of sources, etc.

Figure 5:
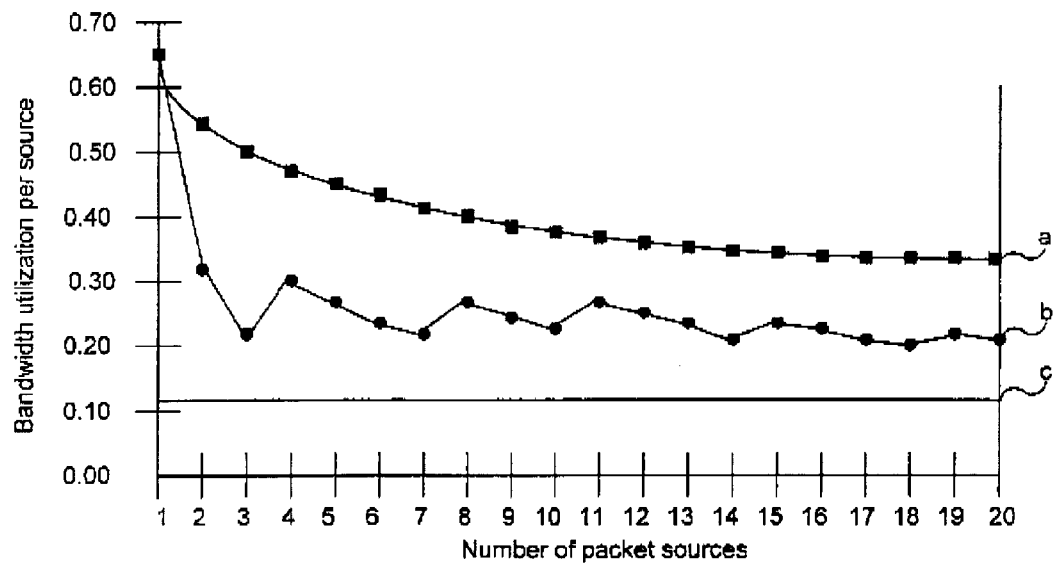
FIG. 5 shows a comparison between the result of a calculation of the efficiency as a function of the number of sources where a synchronized and an unsynchronized release of the voice encoders are performed.

FIG. 5 shows the result of a calculation of the efficiency as a function of the number of sources where an unsynchronized and a synchronized release of the voice encoders is performed. The saw tooth shaped curve is due to that AAL2 packets being segmented into two ATM cells if an integer number of AAL2 packets does not fit entirely into a particular ATM cell. In this example the characteristics of CS-ACELP is used whereby a maximum of three complete AAL2 packets fit into the ATM cell payload. If four AAL2 packets are used to fill an ATM cell, one AAL2 packet is segmented and its remainder put into a subsequent ATM cell.

Figure 6:
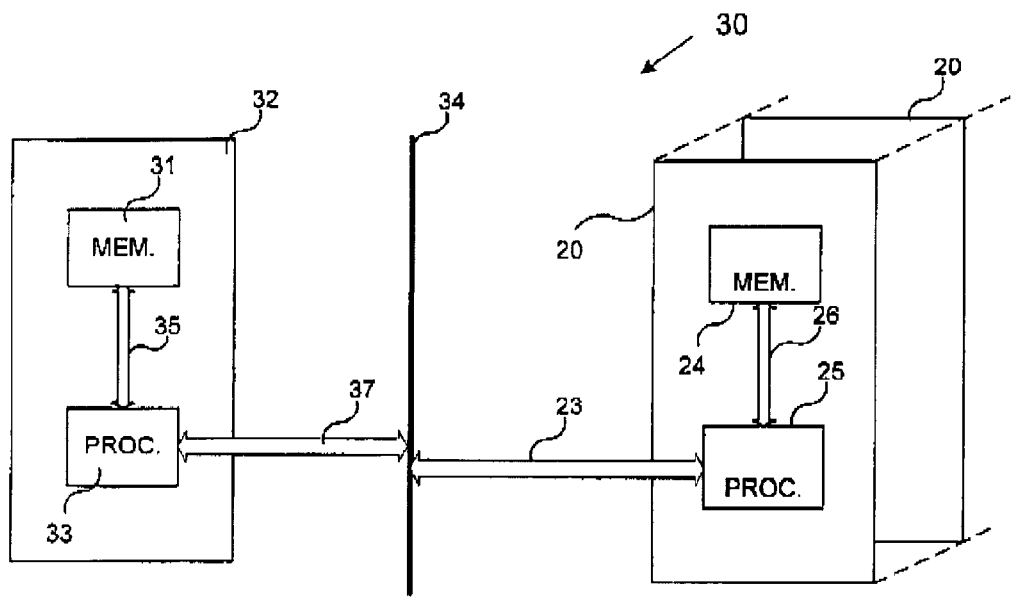
FIG. 6 shows a block diagram of the synchronizing unit and the packetizing means according to a preferred embodiment of the invention.
Figure 7:
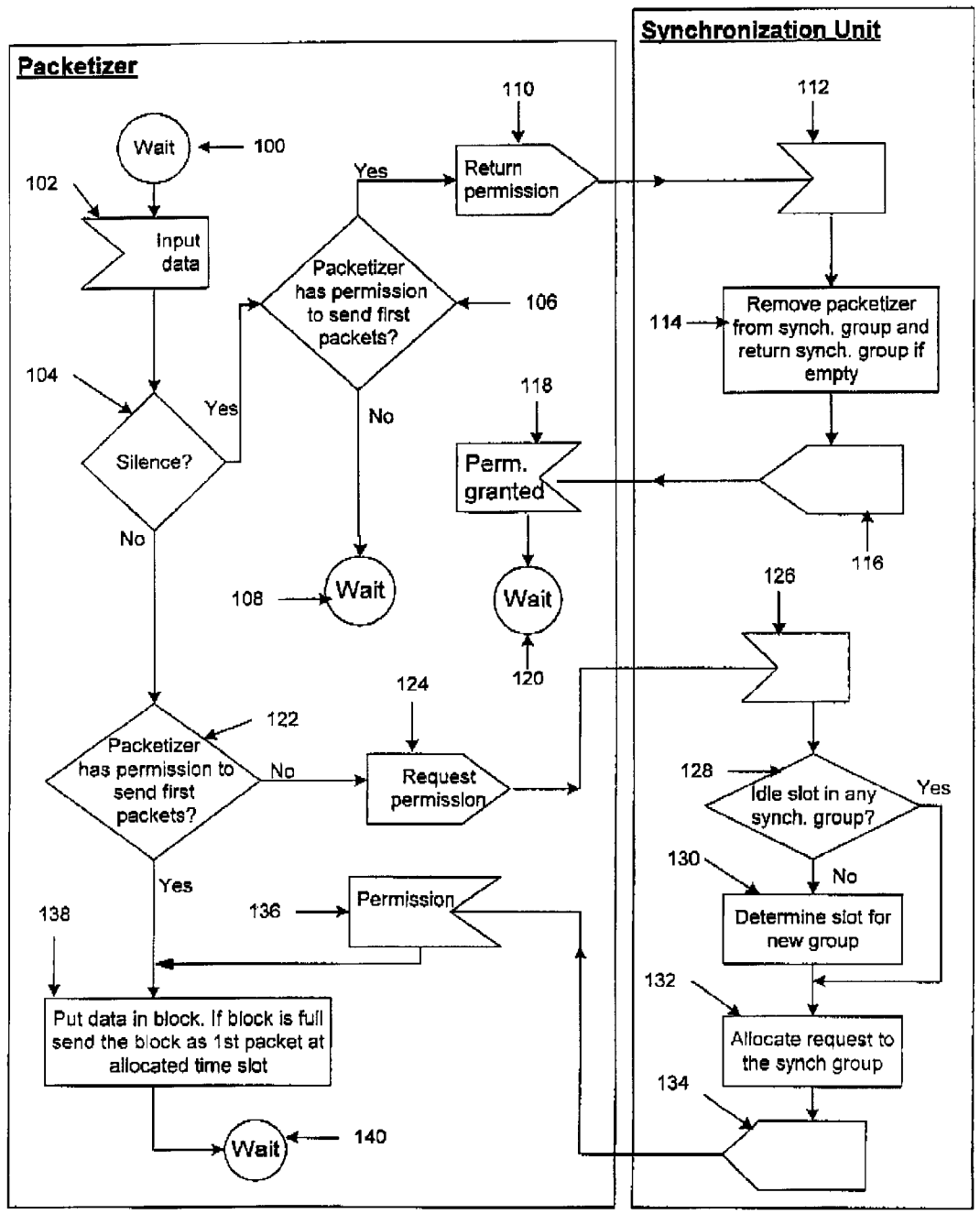
FIG. 7, is a flow diagram according to a preferred embodiment of the invention.

FIG. 6 shows a block diagram of the synchronizing means 30 according to a preferred embodiment of the invention. Accordingly, the synchronizing unit 32 comprises a memory 31, a processor 33 and means 35 for transporting Information between the memory 31 and processor 33 for implementing the synchronization algorithm as shown in FIG. 7 below. The packetizing means 20 comprises a memory 24, a processor 25, and and means 26 for transporting information between the memory 24 and processor 25 for implementing the packetization of data. A bus 34 transfers requests for permission to packetize, permissions and return permissions between the processors 25, 33 of the synchronizing unit 32 and several packetizing means 20 respectively via the communication means 23, 37.

The purpose of the request signal 40 is to notify the synchronizing unit 32 of an initialization of a packetizing means 20 which is ready to transmit voice packets. An initialization takes place when a packetizing means 20 is about to be put in use for an active voice channel, either when establishing a voice channel or when a voice channel already is established, e.g. when using silence techniques, but at the beginning of a talk spurt, i.e. after a silence period. It will also notify the synchronizing unit 32 when a packetizing means 20 has become idle, i.e. not in use for a voice channel or at the beginning of a silence period.

The packet synchronization bus 34 is used to transmit packet synchronization information from the synchronizing unit 32 to all packetizing means 20. Packet synchronization consists of information at which particular sample a block shall be initiated to be assembled as input to an encoder 22 or when a bit block coming as output of an encoder 22 shall be initiated to be packetized in a packetizer 21. Packet synchronization information needs only to be transmitted once to a particular packetizing means 20 during the packetizing means 20 active interval unless resynchronization is needed, e.g. after a silence period. An active interval is the interval during which the packetizing means 20 is used to packetize/encode an active voice channel, e.g. during a talk spurt, if silence removal is employed, or during the full duration of the connection.

The synchronizing unit 32 determines, based on knowledge about active packetizers 21, how to synchronize the active packetizer 21. All the packetizers 21 that are synchronized belong to the same synchronization group. The number of packetizers 21 to be put in a synchronization group is determined by the number of AAL2 packets 61 that fit into one ATM cell 4. The padding shall be minimized or removed entirely by completely filling the ATM cell by means of segmentation. However, to have all packetizers 21 to simultaneously release their packets will result in a queue of ATM cells to be transmitted into the ATM connection, which will lead to additional delay due to the limited rate of the ATM connection and the cell queue. Packetizers 21 shall therefore be distributed in synchronization groups which in turn are evenly distributed in time. However, by synchronizing the voice packets from several sources 10, an ATM cell 4 will always be filled virtually instantaneously with the effect that the Timer_CU 51 will not expire. This in fact leads to a reduction of the average packetization delay.

The synchronizing unit 32 preferably takes the following actions:

1 At an activation request from an packetizer 21/encoder 22, it will be allocated to an appropriate synchronization group. The rationale is to keep the number of synchronization groups low by maximizing the filling of the ATM cells 4.

2. Synchronization groups will be created with an even distribution in time to avoid ATM cell bursts.

3. Optionally, it shall be possible to reallocate an packetizer 21/encoder 22 to another synchronization group in order to maximize the ATM cell filling. This situation is possible when other packetizers 21/encoders 22 become inactive, e.g. due to silence periods. A result will, however, possibly be a loss of one or several samples, but not as much as a voice packet, due to the resynchronization process. However, since the number of sources 10 is low, the rate at which resynchronization for a particular packetizer 21/encoder 22 occurs should be extremely low.

FIG. 7 is a flow diagram according to a preferred embodiment of the invention and accordingly, in step 100 a packetizer 21 waits until it in step 102 receives a data input x,y,z. In step 104 the packetizer 21 determines if it is silence. If the answer is yes, in step 106, the packetizer 21 determines if it has a permission to produce first packets. If the answer is no, in step 108, the packetizer 21 waits. If the answer is yes, in step 110, the packetizer 21 transmits the request to return the permission to the synchronizing unit 32. In step 112 the synchronizing unit 32 receives the request to return the permission to packetize and in step 114 removes the packetizer 21 from the synchronization group and returns the synchronization group if it is empty to the synchronizing unit 32 itself, e.g. to an idle list of unassigned synchronization groups. In step 116 the synchronizing unit 32 acknowledges that the permission to packetize has been returned to the synchronizing unit 32 and in step 118, the packetizer 21 receives the permission returned and in step 120 waits. If, in step 104, the packetizer 21 determines that there is no silence, in step 122, it determines if it has a permission to produce first packets. If the answer is no, in step 124, the packetizer 21 requests permission to packetize 40 from the synchronizing unit 32 In step 126 the synchronizing unit 32 receives the request for permission 40 and in step 128 determines if there is an idle slot in any synchronization group. If the answer is no, in step 130, the synchronizing unit 32 determines a slot time for a new synchronization group and establishes the synchronization group. In step 132, the synchronizing unit 32 allocates the request for permission to the synchronization group. If the answer is yes in step 128, it directly allocates the request for permission to the synchronization group in step 132. In step 134 the synchonizing unit 32 transmits permission to packetize to the packetizer 21, and in step 136 the packetizer 21 receives the permission. In step 138 the packetizer 21 puts the input data in a block and if the block is full, sends the block as first packet at the allocated time slot defined by the synchronization group. If the answer in step 122 is yes, the packetizer 21 directly puts the input data in a block and if the block is full, sends the block as first packet at the allocated time slot defined by the synchronization group as in step 138. In step 140 the packetizer 21 waits.

I claim:

1. A method of packetizing at least two data streams, comprising the steps of:
   producing a first packet from each one of the respective data streams; and
   coordinating the packetizing of the respective data streams to substantially, synchronously produce each said first packet resulting from the respective data streams, wherein the coordinating step comprises the steps of:
      a respective packetizing means receiving the respective data streams, the respective packetizing means requesting permission for packetizing from a synchronizing means,
      the synchronizing means receiving the permission request from the respective packetizing means to packetize said first packets resulting from the respective data streams, and
      the synchronizing means transmitting permission to packetize to the respective packetizing means, to coordinate said respective packetizing means to release said first packets resulting from the respective data streams substantially synchronously with first packets produced by said other packetizing means.

2. The method according to claim 1, wherein the step of requesting permission is performed when setting up a data channel or upon arrival of a data spurt.

3. The method according to claim 1, further comprising the steps of:
   the synchronizing means forming synchronization groups, each synchronization group comprising between one and a predetermined number of packetizing means, and the packetizing means substantially synchronously releasing said first packets resulting from the respective data streams, and
   the synchronizing means, when receiving said permission request from the respective packetizing means, determining if any synchronization group has been allocated less than the predetermined number of packetizing means and if so allocating said respective packetizing means to such a synchronization group, and if not then forming a new synchronization group.

4. The method according to claim 1, further comprising the step of multiplexing the first packets, resulting from said at least two data streams, into respective second packets onto a packet oriented transport medium.

5. The method according to claim 4, further comprising the steps of:
   the synchronizing means forming synchronization groups, each synchronization group comprising between one and a predetermined number of packetizing means, and the packetizing means belonging to each synchronization group substantially synchronously releasing said first packets resulting from said at least two data streams,
   the synchronizing means, when receiving said permission request from the respective packetizing means, determining if any synchronization group has been allocated less than the predetermined number of packetizing means and allocating said respective packetizing means to such a synchronization group, and if not then forming a new synchronization group, and
   the synchronizing means selecting said predetermined number of packetizing means belonging to each synchronization group, depending on how many said first packets resulting from said at least two data streams fit Into said second packet.

6. An apparatus for packetizing at least two data streams, comprising:
   at least two packetizing means, each packetizing means producing a first packet from each one of the respective data streams; and synchronizing means for coordinating the packetizing means to substantially synchronously produce said first packets from said respective data streams, wherein the synchronizing means comprises:

means for receiving permission requests for packetizing from the respective packetizing means;

means for transmitting permission to packetize to the respective packetizing means; and a synchronizing unit for transmitting said permission to packetize to the respective packetizing means, to coordinate said respective packetizing means, to release substantially synchronously said first packets from said respective data streams with first packets produced by said other packetizing means.

7. The apparatus according to claim 6, wherein the synchronizing unit comprises means for forming synchronization groups, each synchronization group comprising between one and a predetermined number of packetizing means.

8. The apparatus according to claim 6, wherein the packetizing means comprises a packetizer for packetizing the respective data stream into first packets.

9. The apparatus according to claim 6, wherein the packetizing means comprises encoding means for encoding, according to a predetermined encoding format, the respective data stream into data blocks and a packetizer for producing first packets from the data blocks.

10. The apparatus according to claim 9, wherein the predetermined encoding format is Adaptive Differential Pulse Code Modulation (ADPCM) or Pulse Code Modulation (PCM) with silence removal.

11. The apparatus according to claim 8, wherein the packetizer is the packetizing protocol ITU-T G.764 or any derivative thereof.

12. The apparatus according to claim 6, wherein the packetizing means comprises a packetizer for producing data blocks from the respective data stream and encoding means for encoding, according to a predetermined encoding format, the data blocks into said first packets.

13. The apparatus according to claim 12, wherein the predetermined encoding format is Global System for Mobile communication (GSM), Coding of Speech at 16 kbit/s using Low-Delay Code Excited Linear Prediction (LD-CELP) or Coding of Speech at 8 kbit/s using Conjugate Structure Algebraic Code Excited Linear Prediction (CS-ACELP).

14. The apparatus according to claim 8, wherein the packetizer comprises means for requesting permission for packetizing and means for receiving said permission to packetize.

15. The apparatus according to claim 9, wherein the packetizing means comprises means for silence removal.

16. A system for packetizing at least two data streams, comprising:

at least two sources producing the respective data streams;

a device for packetizing said at least two data streams, the device comprising at least two packetizing means, each packetizing means producing a first packet from each said respective data stream;

synchronizing means for coordinating the packetizing means to substantially synchronously produce each said first packet from said respective data stream, wherein the synchronizing means comprises:

means for receiving permission requests for packetizing from the respective packetizing means;

means for transmitting permission to packetize to the respective packetizing means;

a synchronizing unit for transmitting said permission to packetize to the respective packetizing means, to coordinate said respective packetizing means, to release substantially synchronously each said first packet from said respective data streams, with additional first packets produced by said other packetizing means;

a packet oriented transport medium; and multiplexing means for multiplexing first packets resulting from each of said packetizing means into respective second packets onto the packet oriented transport medium.

17. The system according to claim 16, wherein the at least two data streams comprise digitized audio and/or video information.

18. The system according to claim 16, wherein the at least two data streams comprise voice data having 8 bit PCM samples at 8 kHz sample rate.

19. The system according to claim 16, wherein the packet oriented transport medium is a transport medium according to the Asynchronous Transfer Mode, the second packets are ATM-cells, and the multiplexing means is an AAL2-multiplexer for producing AAL2-packets from the first packets and multiplexing the AAL2-packets into the second packets.

20. The system according to claim 16, wherein the packet oriented transport medium is a transport medium according to Frame Relay or IP.

21. The system according to claim 16, wherein the system comprises less than 50 sources.

22. The system according to claim 16, wherein the synchronizing unit further comprises means for forming synchonization groups, each synchronization group comprising between one and a predetermined number of packetizing means.

23. The system according to claim 22, wherein the predetermined number of packetizing means that belong to a synchronization group is determined by the number of whole AAL2-packets that fit into the respective ATM-cells.

24. The system according to claim 22, wherein the predetermined number of packetizing means that belong to a synchronization group is determined by the number of AAL2-packets that optimally fit into the respective ATM-cells, when the AAL2-packets are segmented and the ATM-cells padded.

* * * * *